Jan. 5, 1960   G. M. BREWER, JR   2,919,727
ATTACHMENT FOR WOOD-TURNING LATHE
Filed Sept. 4, 1956
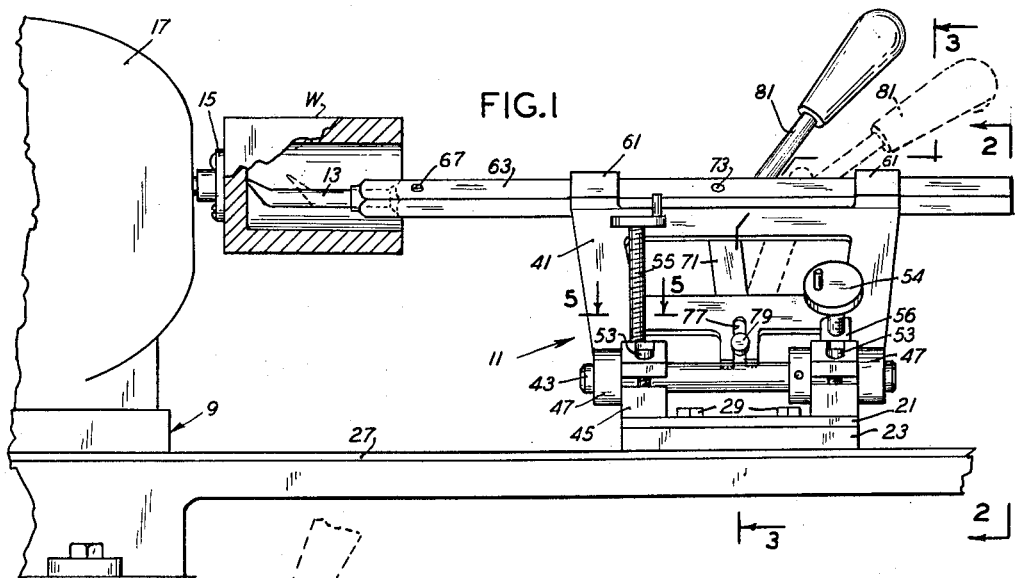
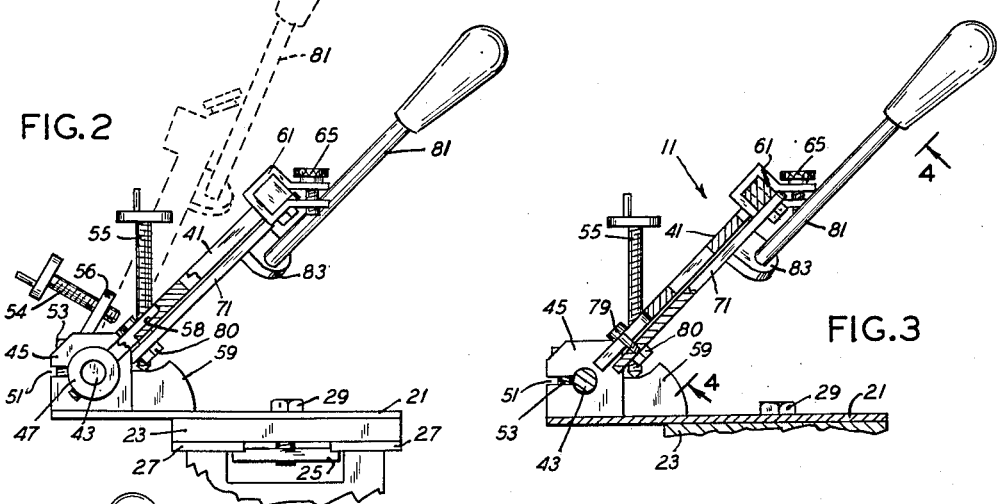
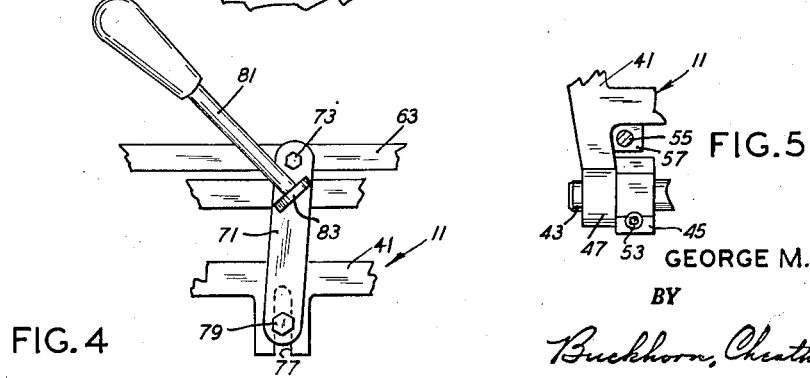
INVENTOR.
GEORGE M. BREWER JR.
BY
Buckhorn, Cheatham & Blore
ATTORNEYS

2,919,727

ATTACHMENT FOR WOOD-TURNING LATHE

George M. Brewer, Jr., Tacoma, Wash.

Application September 4, 1956, Serial No. 607,698

1 Claim. (Cl. 142—55)

This invention relates to an attachment for a wood-turning lathe, and particularly to an attachment for performing faceplate work.

Faceplate work is presently performed by the home craftsman on his wood-turning lathe with only the aid of hand tools. This means that in order to obtain accurate work, the home craftsman must be extremely careful, and thus the job of performing faceplate operations is tedious and time consuming. While there are, of course, production machines for accurately and rapidly performing faceplate work, these machines obviously are much too expensive for the home craftsman.

It is a main object of the present invention to provide a simple and inexpensive lathe attachment which may be mounted on the home wood-turning lathe and by which the home craftsman may accurately and rapidly perform various faceplate work operations.

A further object of the present invention is to provide an attachment of the above character which includes a single handle which may be operated to feed a tool into the work and to laterally move the tool along the work.

The tool of the present invention includes a holder which is swingably mounted on a base clamped to the ways of a lathe and which slidably carries a tool holding bar. The holder may be pivoted to feed the tool radially of the work and the bar may be fed axially toward the work by operation of a handle which is mounted on the holder and connected to the bar.

Various other objects of the present invention will be apparent from the following description taken in connection with the accompanying drawings, wherein:

Fig. 1 is a side view of a lathe having an attachment of the present invention mounted thereon;

Fig. 2 is a view in end elevation taken along line 2—2 of Fig. 1, parts being broken away for convenience in illustration;

Fig. 3 is a sectional view in elevation taken along line 3—3 of Fig. 1;

Fig. 4 is a fragmentary view taken in the direction of the arrows 4—4 of Fig. 3, showing certain details of construction; and Fig. 5 is a fragmentary horizontal sectional view taken along line 5—5 of Fig. 1.

Referring to the accompanying drawings, a conventional wood-turning lathe 9 has an attachment 11 of the present invention mounted thereon. A tool 13 is mounted on the attachment for operating on a piece of work W mounted on a conventional faceplate 15. The faceplate is mounted on the hollow spindle, not shown, of the headstock 17 of the lathe.

More in particular, the attachment includes a base including a base plate 21 (Fig. 2) which is mounted by means of an adapter plate 23 and a clamping plate 25 to the ways 27 of the lathe 9 by means of bolts 29. The adapter plate is secured to the base plate 21 by bolts, not shown. A holder 41 in the form of a relatively flat apertured plate, Figs. 1 and 2, is swingably mounted on the base by means of a pivot shaft 43 which is pivotally received by a pair of spaced bearings 45.

The shaft 43 extends through spaced bosses 47 formed on the holder 41. The bosses straddle the bearings 45 and the shaft is secured to the bosses by setscrews, not shown, which may engage flats, not shown, formed on the ends of the shaft. The plain bearings 45 are fixedly secured to the base plate 21 at the left-hand margin thereof, as the parts are shown in Fig. 2, and are formed with slots 51 and provided with bolts 53 which extend through the slotted portions of the bearings. The holder may be releasably locked in any position of adjustment by tightening the bolts, or a drag may be put on the holder by tightening the bolts 53 a lesser extent.

For limiting swinging or pivoting movement of the holder 41, suitable adjustment screws 54 and 55 are provided, screw 54 being inclined and threadedly received by an upstanding boss 56 on the right-hand bearing, as the parts are shown in Fig. 1, and screw 55 being vertical and threadedly received by a suitable boss 57, Fig. 5, provided on the holder 41. The threaded end of the screw 54 is adapted to engage a suitable stop 58, Fig. 2, provided on the holder 41, the stop preferably presenting a concave face to the end of the screw for proper contact of the screw with the stop in any position of adjustment of the holder relative to the screw. A stop 59, Fig. 2, having a curved face is provided on the base plate 21 for engagement by the threaded end of the adjustment screw 55.

The upper end of the holder 41 is provided with a pair of spaced guides 61 in the form of collar clamps which slidably receive the tool bar 63 to guide the tool bar for lengthwise movement in a direction parallel to the ways 27 of the lathe and also parallel to the axis of rotation of the faceplate 15.

The collar clamps are provided with screws 65 by which the bar may be releasably locked in any position of adjustment, or a suitable drag may be placed on the bar. The collar clamps and bar are square in cross-section so that the bar is nonrotatably held in the collar clamps, even when the collar clamps are loose.

The left-hand end of the bar 63 is provided with an axial bore, not shown, to receive a suitable tool, such as the tool 13, a setscrew 67 being provided for releasably fixing the tool within the bar. It is pointed out that the axis of the bar 63 is spaced from the axis of the pivot shaft 43 by a distance substantially equal to the distance between the pivot shaft axis and the axis of the faceplate 15.

A suitable mechanism is provided for pivoting the holder 41 about the axis of the pivot shaft 43, and for advancing or retracting the bar 63. The mechanism includes a second class lever disposed at the underside of the holder 41 and comprises a lever arm 71 pivoted at 73 to the bar 63 at a place intermediate the collar clamps 61. The lever arm has a pivot bolt provided with a head 79 (Fig. 1) slidably engaging the upper face of the holder and a nut 80 next to the lever arm so that the lever is retained against the underside or lower face of the holder. The lever further includes a handle 81 which is fixedly connected at its lower end to a boss 83 on the lever arm 71 intermediate the ends thereof. The handle 81 together with the lever arm 71 constitute a second class lever.

In operation, it may be assumed that an inside turning operation is to be performed. First, a drill, not shown, is mounted in the tool bar 63 and the adjustment screw 55 adjusted so that when the screw rests on the stop 59, the drill will be disposed coaxially with respect to the axis of the chuck. The handle 81 is then swung to the left as the parts are shown in Fig. 1, from the dotted line position to the full line position, to feed the drill into the work and form an initial bore of the depth of the finished recess. The drill is then replaced with a suitable turning tool, such as tool 13, and the screw 54 is adjusted to provide the amount of cut desired, usually a smaller amount than the radius of the recess. The holder is then swung against the adjustment screw 54 and the tool fed inwardly to make a first cut. Of course, the screws 65 are loosened to permit inward feeding of the tool bar 63 and thus inward feeding of the tool 13. The adjustment screw 54 is then adjusted progressively outwardly, accompanied by inward feeding movements of the bar to hollow out the piece of work to the desired extent.

For tough wood, the holder may be locked in a position against the screw 54 by tightening the bolts 53 so that the wood cannot kick the tool inwardly. Also, when performing facing operations on stock, the bar may be locked in a desired position by tightening the screws 65. Accurate outside turning operation may readily be performed by progressively adjusting screw 55 as the various cuts are taken.

Having described the invention in what is considered to be the preferred embodiment thereof, it is desired that it be understood that the invention is not to be limited other than by the provisions of the following claim.

I claim:

An attachment for a wood turning lathe including a frame having stationary power means for rotating a head stock carrying a piece of work, said attachment comprising a base, a holder pivotally mounted on said base, means for securing said base to the lathe frame adjacent the lathe head stock with the pivotal axis of said holder parallel to the axis of rotation of said head stock but offset therefrom, a tool supporting bar mounted on said holder for lengthwise movement of the bar along a path which is parallel to the pivotal axis of said holder but offset therefrom by a distance to dispose said bar locally of the axis of rotation of said head stock, said bar having means for supporting a tool for performing operations on the work, means for releasably holding said bar against movement relative to said holder, a link pivotally connected to both said bar and said holder, and a handle fixed to said link and extending beyond the pivotal connection between said link and said bar so that when a force is applied to the handle in a direction generally parallel to the length of the bar said bar will be moved relative to said holder, and so that when a force is applied to said handle in a direction generally transverse to the length of the bar, the holder will be pivoted about its axis.

References Cited in the file of this patent

UNITED STATES PATENTS

| 67,757 | Hart | Aug. 13, 1867 |
| 455,862 | Winsor | July 14, 1891 |
| 1,189,926 | Ellis | July 4, 1916 |
| 1,599,611 | Dover | Sept. 14, 1926 |
| 1,876,992 | McLeod | Sept. 13, 1932 |